Sept. 24, 1963 R. K. GALLOWAY Re. 25,450

CARTON CLOSING MECHANISM

Original Filed Feb. 17, 1961 6 Sheets-Sheet 1

INVENTOR
ROBERT K. GALLOWAY

BY Hans G. Hoffmeister
ATTORNEY

CARTON CLOSING MECHANISM

Original Filed Feb. 17, 1961 6 Sheets-Sheet 2

INVENTOR
ROBERT K. GALLOWAY
BY Hans G. Hoffmeister
ATTORNEY

CARTON CLOSING MECHANISM
Original Filed Feb. 17, 1961 6 Sheets-Sheet 3
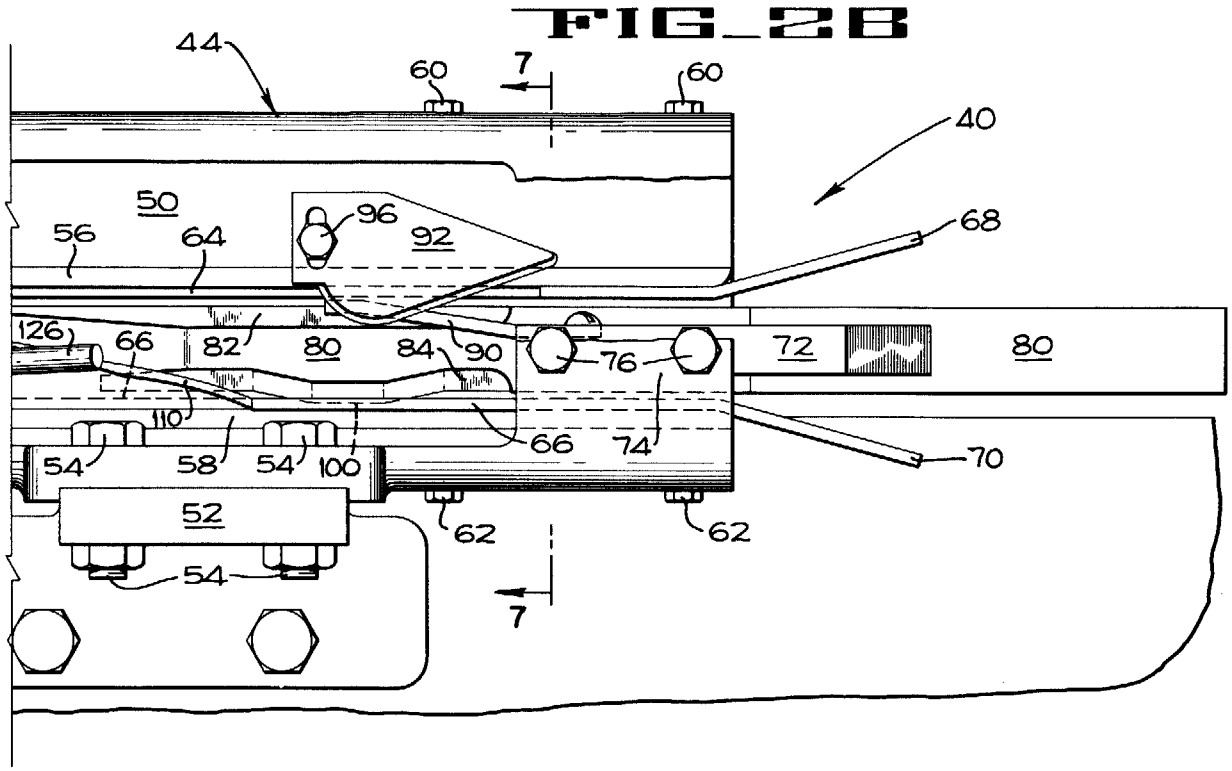
INVENTOR
ROBERT K. GALLOWAY
BY Hans G. Hoffmeister
ATTORNEY CARTON CLOSING MECHANISM
Original Filed Feb. 17, 1961 6 Sheets-Sheet 4
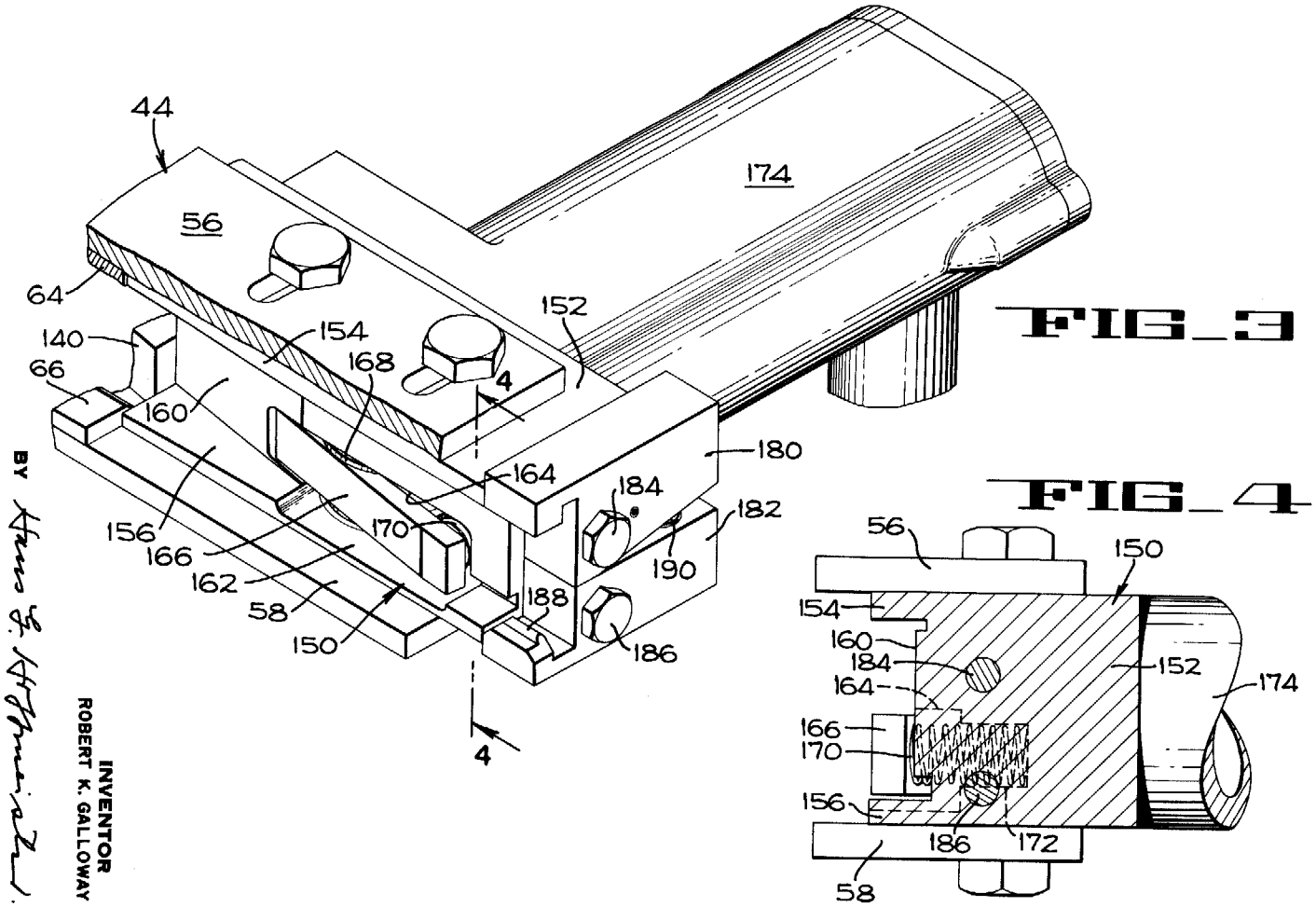
INVENTOR
ROBERT K. GALLOWAY
BY Hans G. Hoffmeister
ATTORNEY

CARTON CLOSING MECHANISM

Original Filed Feb. 17, 1961 6 Sheets-Sheet 5

INVENTOR
ROBERT K. GALLOWAY

BY Hans G. Hoffmeister
ATTORNEY

CARTON CLOSING MECHANISM

Original Filed Feb. 17, 1961 6 Sheets-Sheet 6

INVENTOR
ROBERT K. GALLOWAY

BY Hans G. Hoffmeister
ATTORNEY

United States Patent Office

Re. 25,450
Reissued Sept. 24, 1963

25,450
CARTON CLOSING MECHANISM

Robert K. Galloway, Hoopeston, Ill., assignor to FMC Corporation, a corporation of Delaware Original No. 3,049,847, dated Aug. 21, 1962, Ser. No. 89,982, Feb. 17, 1961. Application for reissue Apr. 22, 1963, Ser. No. 274,882
12 Claims. (Cl. 53—374)

Matter enclosed in heavy brackets [ ] appears in the original patent but forms no part of this reissue specification; matter printed in italics indicates the additions made by reissue.

This invention pertains to packaging machinery, and more particularly relates to a machine for closing cartons characterized by having one or more locking tabs on one closure flap adapted to be inserted into a corresponding number of slots in a companion flap.

In my prior, copending application, Serial No. 757,596, filed August 27, 1958, now U.S. Patent No. 2,979,876, and entitled Carton Closing Mechanism, I disclosed a machine for folding the flaps at an end of a carton into carton closing relation and for inserting locking tabs on one of the flaps into slits centrally located on the other flap.

Although cartons of the type handled by the closing machine of the said copending application have been used successfully, they have been found to possess certain undesirable characteristics. For example, their closed and interengaged end flaps have the tendency to spring outward and thus to impart a bowed, rather than the desirable flat configuration to the closed carton end. The outward displacement of the flaps not only causes slippage of the tabs within the locking slits and consequent weakening of the locking relationship, but materially reduces the resistance of the carton to crushing when several cartons are stacked one on top of the other. Further, the medial position of the locking slits interferes with desirable printing of the carton end.

In order to overcome the several disadvantages enumerated above, the improved carton illustrated in FIGS. 5 and 6 of this application has been developed. In this type of carton the outer end closure flap extends clear across the underlying, or inner, flap so that locking tabs constituting prolongations of the distal edge of the outer flap engage within slits at the crease line between the inner flap and its associated side panel of the carton. In other words, the locking engagement of the outer flap with the body of the carton occurs at the proximal edge of the inner flap, rather than at the center thereof as heretofore.

The carton closing mechanism of the present invention is specifically designed for closing the above described, improved cartons.

It is, therefore, an object of the present invention to provide an improved carton closing mechanism.

Another object of the invention is to provide a mechanism for closing said improved cartons at high speed.

Another object of the present invention is to provide a mechanism for closing said improved cartons moving therethrough at high speed, which mechanism does not have moving parts.

These and other objects and advantages of the present invention will become apparent from the following description and the accompanying drawings, wherein:

FIG. 1 is a fragmentary perspective of the carton closing mechanism of the present invention.

FIGS. 2A and 2B together are a side elevation of a carton closing plow included in the mechanism of FIG. 1, certain parts being broken away to reveal details of structure therebehind.

FIG. 3 is an enlarged isometric of a heated crimping shoe for effecting the final closure and setting of the end flaps of the carton.

FIG. 4 is a transverse section through the crimping shoe taken on line 4—4 of FIG. 3.

Figure 2A:
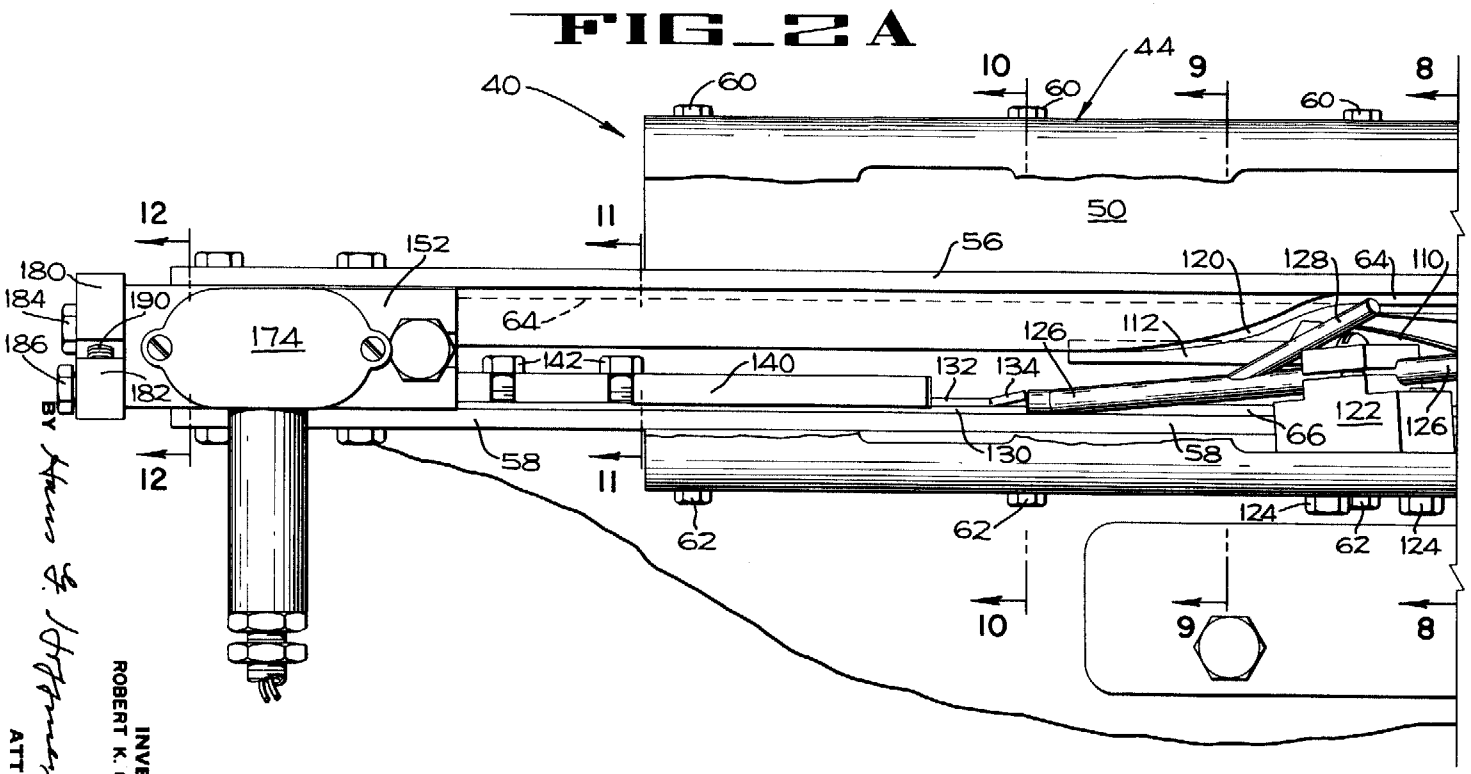

FIGS. 7, 8, 9, 10, 11 and 12 are sections taken on lines 7—7, 8—8, 9—9, 10—10, 11—11 and 12—12, respectively, of FIGS. 2A and 2B and illustrating successive steps of closing and locking the carton end flaps.

Figure 5:
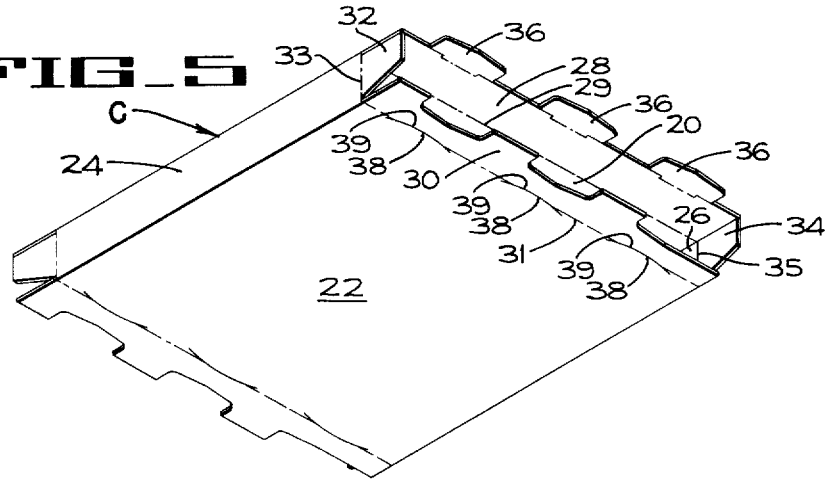
FIG. 5 is an isometric of one of the "Edge-lock" cartons adapted to be closed by the mechanism of the present invention, the carton being viewed from below and shown with its end flaps opened.
Figure 6:
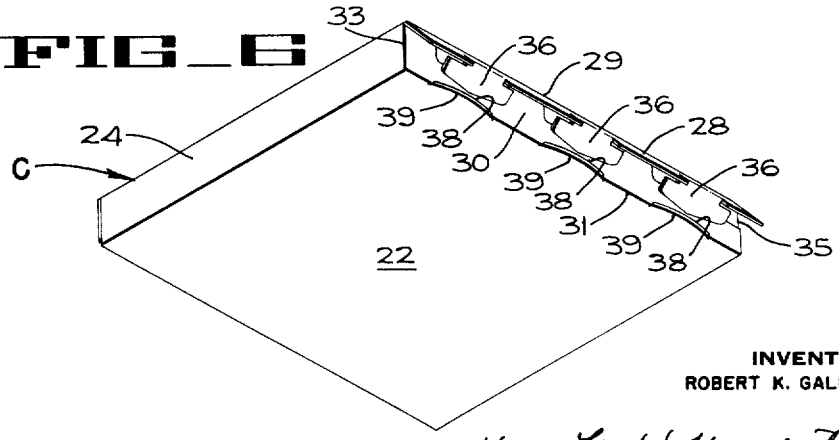
FIG. 6 is a view similar to FIG. 5 with the carton end flaps shown partially closed.

One of the cartons C adapted to be closed by the mechanism of the present invention is illustrated in FIGS. 5 and 6, and comprises a top panel 20, a bottom panel 22, and forward and rear panels 24 and 26, respectively. End flaps 28, 30, 32 and 34 are connected to the lateral edges of the panels 20, 22, 24 and 26 along crease lines 29, 31, 33 and 35, respectively. A plurality of spaced locking tabs 36 are connected to the distal end of the flap 28 associated with the top panel 20 and constitute prolongations thereof. A plurality of arcuate slits 38 are formed partially in the bottom panel 22 and partially in the flap 30 associated therewith. It will be noted that the end portions of the arcuate slits 38 are in the bottom panel 22 and that the central portions of the slits are in the end flap 30. When the flap 30 is folded to its closed position, the central portion of each slit 38 forms a lip 39 which extends outward beyond the outer surface of the flap 30.

Figure 1:
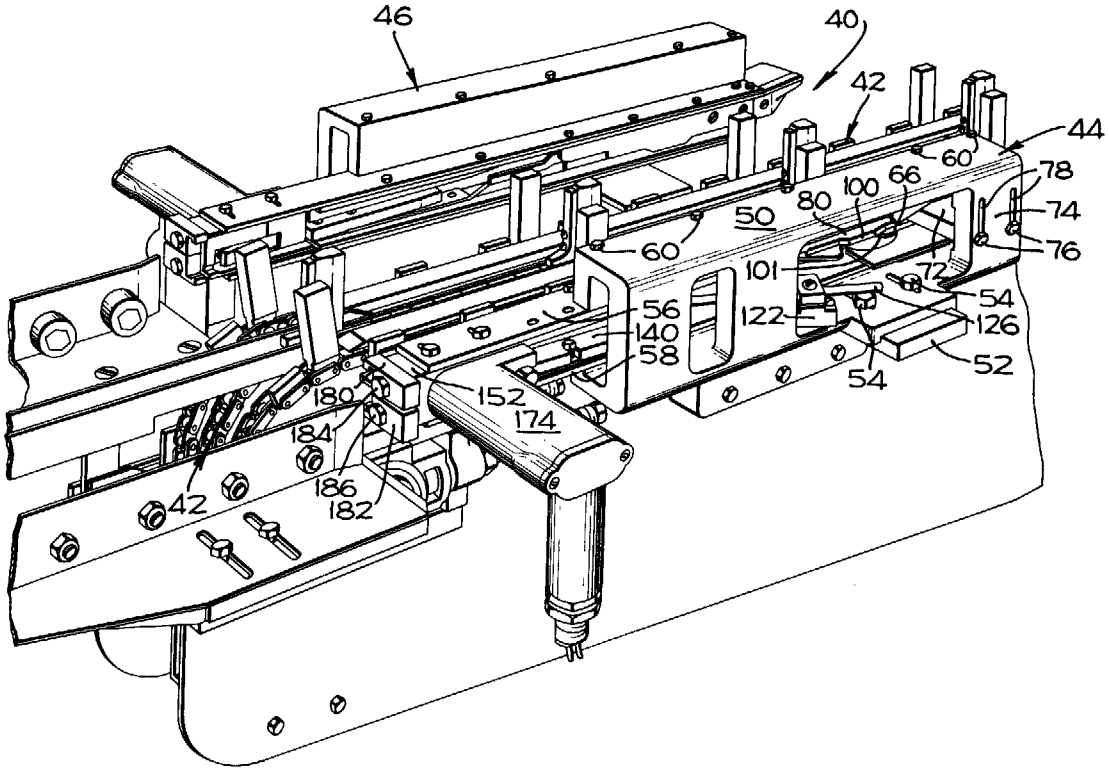

The carton closing mechanism 40 (FIG. 1) of the present invention comprises a conveyor 42 for successively advancing the cartons C to be closed between two closing plows or shoes 44 and 46 which fold the top and bottom carton flaps 28 and 30 into overlapping relation with each other, and insert the tabs 36 on the top flap 28 into the slits 38 in a progressive, "zipper-like" fashion as the cartons move therebetween.

Since the two plows 44 and 46 are mirror images of each other, only the plow 44 will be described in detail.

The plow 44 comprises a C-shaped bracket 50 (FIGS. 1, 2A, 2B, 7, 8, 9, and 10) secured to a mounting bedplate 52 (FIG. 2B) by bolts 54. Two vertically spaced support plates 56 and 58 (FIGS. 2A, 2B, 7, 8, 9, 10, 11 and 12) are fastened to the opposed edges of the C-shaped bracket 50 by a plurality of cap screws 60 and 62, respectively. An upper carton guide plate 64 is fixed to the under surface of the upper support plate 56 and, similarly, a lower guide plate 66 is fixed to the upper surface of the lower support plate 58. The rear, or carton-receiving, end 68 of the upper guide plate 64 slopes upward and rearward so that upper end flap 28 of each carton advancing therepast will be guided thereunder. Similarly the rear, or carton receiving end, 70 of the lower guide plate 66 inclines downward and rearward so that the lower end flap 30 of the carton will be guided thereabove.

A spacer block 72 (FIGS. 2B and 7) is fixed to the web portion 74 of the C-shaped member 50 adjacent the rear, or entrance, end thereof by a plurality of cap screws 76 which extend through vertical slots 78 in the web portion. The block 72 extends inward from the web portion and supports a vertical plate 80 fastened to its inner end by countersunk set screws 81 which project through openings in the plate 80 and are threaded into suitable openings provided in the inner surface of the block 72. The plate 80 serves to retain the forward and rear end flaps 32 and 34 of the carton in their folded relation previously established by a mechanism not illustrated herein. The flaps 32 and 34 ride against the inner surface of the plate 80. The upper and lower edges of the plate 80 are chamfered as illustrated in FIG. 2B at 82 and 84, respectively, to provide relatively thin edges about which the upper and lower carton flaps 28 and 30 are folded.

Figure 7:
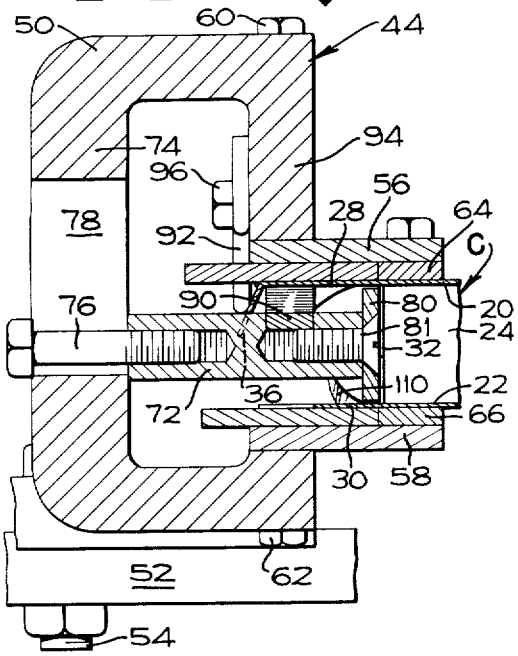
Figure 8:
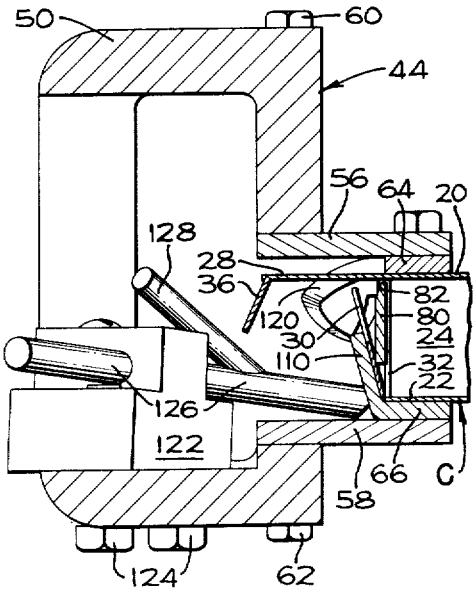

A guide and support bar 90 is mounted in a recess in the upper surface of the block 72 so that its upper surface is coplanar with the upper surface of the block. The bar 90 projects forward and upward therefrom to contact and support the upper carton flap 28 briefly after a carton C has moved past the block 72, with the outer edge of the guide bar 90 just inside the line of juncture between the locking tabs 36 and the flap 28. A depending cam 92 is fixed to the inner surface of the upper leg 94 of the C-shaped bracket 50 by a cap screw 96. The cam 92 depends past the outer edge of the bar 90 in position to be contacted by the tabs 36 as they pass beyond the upper guide plate 68 and, while the flap 28 is supported by the bar 90, to fold the tabs downward to a position substantially perpendicular to the flap 28, as shown in FIG. 7.

Just forward of the cam plate 92, the lower edge of the previously described vertical plate 80 is provided with a downwardly projecting cam edge 100 (FIG. 2B), and the lower guide plate 66 is cut out as indicated at 101 (FIG. 1) adjacent thereto. As a carton C moves therepast, the cam edge 100 presses downward on the crease line 31 between the lower carton panel 22 and the lower flap 30 and causes the slits 38 to pop open.

Forward of the cam edge 100, the bottom guide plate 66 is provided with an integral wing cam 110 (FIGS. 2A, 2B and 8) which projects outward therefrom and gradually turns upward until its forward end is substantially perpendicular to the guide plate 66. As each carton advances, the wing cam folds the bottom end flap 30 thereof around the lower thin edge of the plate 80. A finger 112 (FIGS. 2A and 9) projects forward from the forward edge of the wing cam 110 to retain the bottom flap 30 vertical and closely adjacent the outer face of the plate 80 until the top flap 28 is folded downward thereover.

Adjacent the forward end of the wing cam 110, the upper guide plate 64 is provided with an outwardly projecting wing cam 120 (FIGS. 2A, 8, 9, and 10) which gradually turns downward until it becomes substantially perpendicular to the guide plate 64. Its function is to fold the top and flap 28 downward around the upper thin edge of the plate 80 and into overlying relation with the bottom end flap 30.

Figure 9:
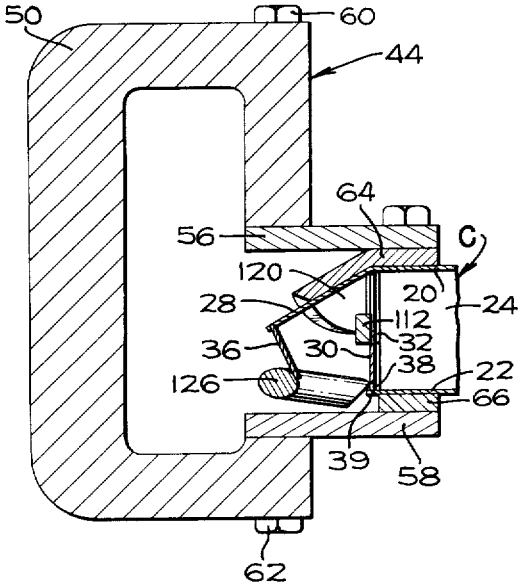
Figure 10:
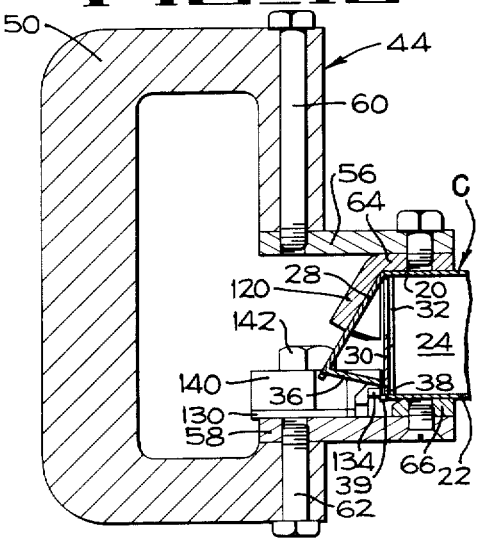

A block 122 (FIGS. 2A and 8) is fastened to the lower flange of the C-shaped bracket 50 adjacent the forward end of the wing cam 110 by a plurality of bolts 124. A guide rod 126 is clamped to the block 122 and projects forward, downward and inward therefrom in the manner best illustrated in FIGS. 8 and 9 so that its inner surface is contacted by and guides the tabs 36 as shown in FIG. 9 as the upper flap 28 is turned downward by the cam wing 120. A second guide rod 128 (FIGS. 2A and 8) is fixed to the upper surface of the rod 126 and extends diagonally upward and rearward therefrom to prevent any of the tabs 36 from passing above and thus failing to engage the rod 126. As best seen in FIG. 9, the lower inner surface of the rod 126 is chamfered adjacent the rod's forward end so that the lip 39 of the slit 38 will pass therebeneath while the tab 36 riding on the guide bar 126 will be guided above the lip 39 and into the slit 38.

Figure 11:
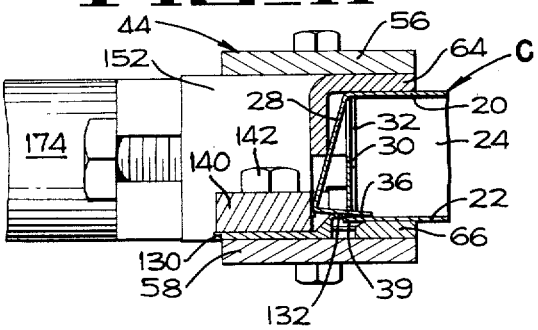
Figure 12:
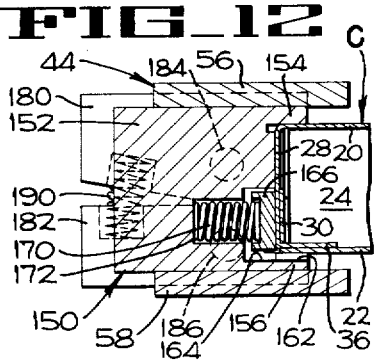

Adjacent the forward end of the guide bar 126, a relatively thin plate 130 (FIGS. 2A and 10) is fixed to the upper surface of the support plate 58. The inner edge of the plate 130 is bent upward and then inward as best seen in FIG. 11 to provide an inwardly projecting ledge 132 beneath which the lip 39 projecting from the carton C adjacent each of the slits 38 rides. The tab 36 is guided by the bar 126 above the lip 132 to enter the slit 38. The rearmost end 134 (FIGS. 2A and 10) of the lip 132 slopes upward and rearward to ensure that the projecting lip 39 on the carton will be guided thereunder.

A presser bar 140 (FIGS. 2A, 10 and 11) is adjustably mounted on the upper surface of the plate 130 by capscrews 142 which project through suitable slots formed in the bar 140 and are threaded into tapped openings in the lower support plate 58. The bar 140 is inclined relatively to the line of travel of the carton C so that its forwardmost end is closer to said line of travel than is its rearmost end. It will be seen from a comparison of FIGS. 10 and 11 that the distal edge of the flap 28 will contact the inner surface of the bar 140 and will be pressed inward thereby so that the tabs 36 will slide along the upper surface of the lip 132 and partially enter the slits 38 in the manner illustrated in FIG. 11.

The final positioning of the tabs 36 within the slits 38 is accomplished by the crimping shoe assembly 150 (FIGS. 2A, 3, 4 and 12). The crimping shoe assembly 150 comprises a C-shaped block 152 mounted between the support plates 56 and 58 with its open end facing inward. The upper and lower flanges 154 and 156 of the block 152 form continuations of the upper and lower guide plates 64 and 66, respectively. The rear portion 160 of the inwardly facing surface of the web portion of the block 152 is inclined rearward and outward to guide the carton end into the crimping shoe from the forward end of the presser bar 140.

The upper surface of the lower flange 156 is recessed as indicated at 162, and a slot 164 is cut into the web portion of the block 152 to accommodate a pivotally mounted presser lever 166. The lever 166 is pivotally mounted at 168 on a vertical pivot pin (not shown), and a spring 170, mounted in a lateral blind bore 172 in the block 152, presses against the forward end of the lever 166 to urge the same inward. A heater assembly 174 is fixed to the outer surface of the block 152 so as to transmit heat to the latter. The heating of the crimping shoe not only facilitates the passage of the carton therethrough by materially reducing the frictional drag, but also the heat aids in setting the carton in its locked condition.

As a carton C leaves the presser bar 140, the inclined portion 160 of the block 152 guides the end of the carton into the crimping shoe 150. The carton pushes the lever 166 into the slot 164 against the pressure of the spring 170. The spring pressure causes the lever 166 to push the flap 28 tightly against the flap 30 and successively forces the tabs 36 all the way into the slits 38 to their final locked position.

Thus it may be seen that as a carton advances with its end slidably engaged with the closing plow, the lower end flap 30 is folded upward in an action that progresses smoothly from one lateral edge to the other, and the upper end flap 28 is folded downward into overlying relation therewith in a similar smooth progressive action, and, as this occurs, the locking tabs 36 are successively entered into their respective slits 38. As the carton progresses past the presser lever 166, the tabs 36 are successively inserted fully into the slits 38. Each tab enters and seats within its slit 38 in a twisting motion, the leading edge entering first, after which the tab experiences a sort of twisting, a rotary movement in its own plane, causing the subsequent entry of the trailing edge and thereafter full insertion of the tab into the slit.

Two crimping members 180 and 182 are fixed to the terminal end of the block 152. The upper member 180 is fixed by capscrew 184 and forms a rigid continuation of the upper flange 154. It is a back up, or thrust resisting member. The lower member 182 is pivotally mounted on a capscrew 186, and is provided with an upwardly projecting grooving ridge 188 in position to engage the bottom carton panel 22 just inside of the crease line 31 thereof. A spring 190 mounted between the outer ends of the members 180 and 182 yieldably retains the pivoted crimping member in position for its ridge 188 to press upward against the bottom panel with sufficient force to bind the panel upward immediately adjacent the fold line 31 and thus sharply crimp the material of the carton along the fold line in a manner that minimizes or eliminates any tendency for the bottom flap to spring back away from its fully closed position. This crimping also causes the inner surface of the bottom panel 22 to bear more tightly against the lower faces of the tabs 36 and thus add to the security with which the tabs are retained within the slits 38.

Since after closure of the carton end is completed, the distal edge of the bottom flap 30 engages the inner surface of the folded down top flap 28 immediately adjacent the hinge line 29 of the latter, and since the fold line 31 of the bottom flap 30 is sharply crimped as above explained, the bottom flap is securely retained in its closed position, and in a substantially flat condition.

Likewise with the carton end closed, the distal edge of the overlying, top flap 28 is attached by its tabs 36 directly to a part of the carton that does not yield longitudinally, i.e., to the lower panel 22 and the region of the underlying, bottom flap 30 immediately adjacent its hinge line 31. Therefore, tendency for the end flaps 28 and 30 to spring back, away from their fully closed position is practically, if not completely, eliminated, with the result that the end of the closed carton remains flat rather than becoming outwardly bowed as in the case if cartons having closure flaps that interlock midway between the hinge lines along which they are connected to their respective top and bottom panels of the carton.

While a preferred embodiment of the present invention is described herein, it should be noted that various changes may be made therein without departing from the spirit of the invention as defined in the appended claims.

The invention having thus been described, what is claimed and desired to be protected by Letters Patent is:

1. In a carton closing mechanism for closing a carton including lower and upper end closure flaps hingedly connected to the lower and upper panels respectively of the carton, said carton having an arcuate slit therein substantially on the crease line between the lower flap and the lower panel, the upper closure flap having a tab projecting from its distal edge in position to enter the slit, the improvement which comprises a conveyor for advancing an erected carton along a predetermined path with the cartoon disposed transversely of the conveyor, carton closing means disposed adjacent said path including means mounted in position for engagement by the tab of the advancing carton for folding said tab downward to a position substantially perpendicular to said upper flap, a lower cam plate having an upturned wing in position for engagement by said lower flap for folding the same upward to a position substantially normal to said lower panel, an upper cam having a downwardly turned wing at a point forward of said upwardly turned wing on the lower cam plate and in position for engagement by said upper flap for folding the same downward toward a position overlying the upwardly turned lower flap, means adjacent said downwardly turned wing of the upper cam and cooperating therewith to guide said tab into said slit as said upper flap is folded downward, and cam means for engaging the outer surface of said upper flap adjacent the distal end thereof and forcing the same inward to push said tab into said slit.

2. In a carton closing mechanism for closing a carton including lower and upper end closure flaps hingedly connected to the lower and upper panels respectively of the carton, said carton having an arcuate slit therein substantially on the crease line between the lower flap and the lower panel, the upper closure flap having a tab projecting from its distal edge in position to enter the slit, the improvement which comprises a conveyor for advancing an erected carton along a predetermined path with the carton disposed transversely of the conveyor, carton closing means disposed adjacent said path including means mounted in position for engagement by the tab of the advancing carton for folding said tab downward to a position substantially perpendicular to said upper flap, means slidably engaging the under surface of said upper flap to support the same while said tab is being folded down by said tab folding means, a lower cam plate having an upturned wing in position for engagement by said lower flap for folding the same upward to a position substantially normal to said lower panel, an upper cam having a downwardly turned wing at a point forward of said upwardly turned wing on the lower cam plate and in position for engagement by said upper flap for folding the same downward toward a position overlying the upwardly turned lower flap, means adjacent said downwardly turned wing of the upper cam and cooperating therewith to guide said tab into said slit as said upper flap is folded downward, and cam means for engaging the outer surface of said upper flap adjacent the distal end thereof and forcing the same inward to push said tab into said slit.

3. In a carton closing mechanism for closing a carton including lower and upper end closure flaps hingedly connected to the lower and upper panels respectively of the carton, said carton having an arcuate slit therein substantially on the crease line between the lower flap and the lower panel, the upper closure flap having a tab projecting from its distal edge in position to enter the slit, the improvement which comprises a conveyor for advancing an erected carton along a predetermined path with the carton disposed transversely of the conveyor, carton closing means disposed adjacent said path including means mounted in position for engagement by the tab of the advancing carton for folding said tab downward to a position substantially perpendicular to said upper flap, means engageable by the advancing carton for pressing downward substantially on the crease line between said lower flap and the lower panel to open said slit, a lower cam plate having an upturned wing in position for engagement by said lower flap for folding the same upward to a position substantially normal to said lower panel, an upper cam having a downwardly turned wing at a point forward of said upwardly turned wing on the lower cam plate and in position for engagement by said upper flap for folding the same downward toward a position overlying the upwardly turned lower flap, means adjacent said downwardly turned wing of the upper cam and cooperating therewith to guide said tab into said opened slit as said upper flap is folded downward, and cam means for engaging the outer surface of said upper flap adjacent the distal end thereof and forcing the same inward to push said tab into said slit.

4. In a carton closing mechanism for closing a carton including lower and upper end closure flaps hingedly connected to the lower and upper panels respectively of the carton, said carton having an arcuate slit therein substantially on the crease line between the lower flap and the lower panel, the upper closure flap having a tab projecting from its distal edge in position to enter the slit, the improvement which comprises a conveyor for an erected carton along a predetermined path with the carton disposed transversely of the conveyor, carton closing means disposed adjacent said path including an elongate plate having chamfered upper and lower creasing edges adjacent and parallel to said path, means mounted in position for engagement by the tab of the advancing carton for folding said tab downward to a position substantially perpendicular to said upper flap, a lower cam plate having an upturned wing in position for engagement by said lower flap for folding the same upward around said lower creasing edge to a position substantially normal to said lower panel, an upper cam having a downwardly turned wing at a point forward of said upwardly turned wing on the lower cam plate and in position for engagement by said upper flap for folding the same downward around said upper creasing edge toward a position overlying the upwardly turned lower flap, means adjacent said downwardly turned wing of the upper cam and cooperating therewith to guide said tab into said slit as said upper flap is folded downward, and cam means for engaging the outer surface of said upper flap adjacent the distal end thereof and forcing the same inward to push said tab into said slit.

5. In a carton closing mechanism for closing a carton including lower and upper end closure flaps hingedly connected to the lower and upper panels respectively of the carton, said carton having an arcuate slit therein substantially on the crease line between the lower flap and the lower panel, the upper closure flap having a tab projecting from its distal edge in position to enter the slit, the improvement which comprises a conveyor for advancing an erected carton along a predetermined path with the carton disposed transversely of the conveyor, carton closing means disposed adjacent said path including a plate having chamfered upper and lower creasing edges extending alongside said path, means mounted in position [for position] for engagement by the tab of the advancing carton for folding said tab downward to a position substantially perpendicular to said upper flap, depending cam means on said plate for pressing downward substantially on the crease line between said lower panel and said flap thereon to open said slit, a lower cam plate having an upturned wing in position for engagement by said lower flap for folding the same upward around said lower creasing edge to a position substantially normal to said lower panel, an upper cam having a downwardly turned wing at a point forward of said upwardly turned wing on the lower cam plate and in position for engagement by said upper flap for folding the same downward around said upper creasing edge toward a position overlying the upwardly turned lower flap, means adjacent said downwardly turned wing of the upper cam and cooperating therewith to guide said tab into said opened slit as said upper flap is folded downward, and cam means for engaging the outer surface of said upper flap adjacent the distal end thereof and forcing the same inward to push said tab into said slit.

6. In a carton closing mechanism for closing a carton including lower and upper end closure flaps hingedly connected to the lower and upper panels respectively of the carton, said carton having an arcuate slit therein substantially on the crease line between the lower flap and the lower panel, the upper closure flap having a tab projecting from its distal edge in position to enter the slit, the improvement which comprises a conveyor for advancing an erected carton along a predetermined path with the carton disposed transversely of the conveyor and with said end flaps horizontal and projecting laterally from their respectively associated panels, carton closing means disposed adjacent said path including means mounted in position for engagement by the tab of the advancing carton for folding said tab downward to a position substantially perpendicular to said upper flap, means slidably engaging and supporting said upper flap in a horizontal plane while said tab thereon is folded down by said tab folding means, means engageable by the advancing carton for pressing down substantially on said crease line between the lower panel and the lower flap to open the slit, a lower cam plate having an upturned wing in position for engagement by said lower flap for folding the same upward to a position substantially normal to said lower panel, an upper cam having a downwardly turned wing at a point forward of said upwardly turned wing on the lower cam plate and in position for engagement by said upper [flat] *flap* for folding the same downward toward a position overlying the upwardly turned lower flap, means adjacent said downwardly turned wing of the upper cam and cooperating therewith to guide said tab into said opened slit as said upper flap is folded downward, and cam means for engaging the outer surface of said upper flap adjacent the distal end thereof and forcing the same inward to push said tab into said slit.

7. In a carton closing mechanism for closing a carton including lower and upper end closure flaps hingedly connected to the lower and upper panels respectively of the carton, said carton having an arcuate slit therein intersecting the crease line between the lower flap and the lower panel, the ends of said slit being in said lower panel and the mid-portion of the slit being in said lower flap, the upper closure flap having a tab projecting from its distal edge in position to enter the slit, the improvement which comprises a conveyor for advancing an erected carton along a predetermined path with the carton disposed transversely of the conveyor and with said end closure flaps projecting laterally beyond said path, carton closing means disposed adjacent said path including means mounted in position for engagement by the tab of the advancing carton for folding said tab downward to a position substantially perpendicular to said upper flap, a lower cam plate having an upturned wing in position for engagement by said lower flap for folding the same upward to a position substantially normal to said lower panel, the part of said lower panel defined by said mid-portion of the arcuate slit remaining horizontal while said lower flap is folded upward to present a lip projecting beyond the outer fact of the upwardly turned lower flap, an upper cam having a downwardly turned wing at a point forward of said upwardly turned wing on the lower cam plate and in position for engagement by said upper [flat] *flap* for folding the same downward toward a position overlying the upwardly turned lower flap, lip engaging means mounted in position for said projecting lip to pass thereunder after the lower flap has folded upward, means adjacent said downwardly turned wing of the upper cam and cooperating therewith to guide said tab over said lip engaging means and into said slit as said upper flap is folded downward, and cam means for engaging the outer surface of said upper flap adjacent the distal end thereof and forcing the same inward to push said tab into said slit.

8. In a carton closing mechanism for closing a carton including lower and upper end closure flaps hingedly connected to the lower and upper panels respectively of the carton, said carton having an arcuate slit therein intersecting the crease line between the lower flap and the lower panel with the ends of the slit in the lower panel of the mid-portion of the slit in the lower flap, the upper closure flap having a tab projecting from its distal edge in position to enter the slit, the improvement which comprises a conveyor for advancing an erected carton along a predetermined path with the carton disposed transversely of the conveyor, carton closing means disposed adjacent said path including an elongate plate extending alongside said path, means mounted in position for engagement by the tab of the advancing carton for folding said tab downward to a position substantially perpendicular to said upper flap, means slidably supporting said upper flap while said tab thereon is being folded, cam means on said elongate plate for depressing said lower panel adjacent said fold line thereof to open said slit, a lower cam plate having an upturned wing in position for engagement by said lower flap for folding the same upward around the lower edge of said elongate plate and to a position substantially normal to said lower panel, an upper cam having a downwardly turned wing at a point forward of said upwardly turned wing on the lower cam plate and in position for engagement by said upper flap for folding the same downward around the upper edge of said elongate plate and toward a position overlying the upwardly turned lower flap, means adjacent said downwardly turned wing of the upper cam and cooperating therewith to guide said tab into said open slit as said upper flap is folded downward, and cam means for engaging the outer surface of said upper flap adjacent the distal end thereof and forcing the same inward to push said tab into said slit.

*9. In a machine for closing an erected carton of the type which has an upper and a lower panel, each of which has a closure flap hingedly connected to its edge, there being a slit in the carton substantially at the crease line between a first one of said flaps and the associated panel, and the second one of said flaps having a tab hingedly connected to its outer end, the combination of a conveyor for moving the carton along a predetermined path with the carton disposed transversely of the path and with its first and second flaps projecting outwardly from their associated panels, first flap folding means arranged to engage the first flap as the carton is advanced and bend it to a generally vertical position, means for bending the tab of the second flap to a position substantially perpendicular to said second flap, and second folding means for engaging said second flap and swinging it about its hinge connection with the associated carton panel to move the bent tab in an arcuate path toward the first flap to enter the slit adjacent the crease line between said first flap and the associated carton panel.*

*10. In a machine for closing an erecetd carton of the type which has an upper and a lower panel, each of which has a closure flap hingedly connected to its edge, there being a slit in the carton substantially at the crease line between a first one of said flaps and the lower panel, and the second one of said flaps having a tab hingedly connected to its outer end, the combination of a conveyor for moving the carton along a predetermined path with the carton disposed transversely of the path and with its first and second flaps projecting outwardly from their associated panels, flap folding means arranged to engage the first flap as the carton is advanced and swing it upwardly to a substantially vertical position, means for bending the tab of the second flap to a position substantially perpendicular to said second flap, and camming means for engaging said second flap and swinging it downwardly about its hinge connection with the upper carton panel to move the bent tab in an arcuate path toward the upright first flap to enter the slit adjacent the crease line between said first flap and the lower panel of the carton.*

*11. In a machine for closing an erected carton of the type which has an upper and a lower panel, each of which has a closure flap hingedly connected to its edge, there being a slit in the carton substantially at the crease line between a first one of said flaps and the lower panel, and the second one of said flaps having a tab hingedly connected to its outer end, the improvement which comprises a conveyor for moving the carton along a predetermined path with the carton disposed transversely of the path and with its first and second flaps projecting outwardly from their associated panels, first camming means having an upwardly inclined camming surface arranged to engage the first flap as the carton is advanced and bend it upwardly to an upright position, means for bending the tab of the second flap to a position substantially perpendicular to said second flap, and second camming means for engaging said second flap and swinging it downwardly about its hinge connection with the upper carton panel to move the bent tab downwardly in an arcuate path toward the upright first flap to enter the slit adjacent the crease line between said first flap and the lower panel of the carton.*

*12. In a machine for closing an erected carton of the type which has an upper and a lower panel, each of which has a closure flap hingedly connected to its edge, there being a slit in the carton substantially at the crease line between a first one of said flaps and the associated panel, and the second one of said flaps having a tab hingedly connected to its outer end, the combination of a conveyor for moving the carton along a predetermined path with the carton disposed transversely of the path and with its first and second flaps projecting outwardly from their associated panels, a cam plate having a wing in position to engage the first flap as the carton is advanced and bend it to a generally vertical position, a fixed cam mounted in the path of movement of the tab of the second flap for engaging said tab and bending it to a position substantially perpendicular to said second flap, and a second cam plate having a wing in the path of movement of the second flap for engaging said second flap and swinging it about its hinge connection with the associated carton panel to move the bent tab in an arcuate path toward the upright first flap to enter the slit adjacent the crease line between said first flap and the associated carton panel.*

References Cited in the file of this patent or the original patent

UNITED STATES PATENTS

| | | |
|---|---|---|
| 2,698,559 | Harkness | Jan. 4, 1955 |
| 2,979,876 | Galloway | Apr. 18, 1961 |